United States Patent
Wang et al.

(10) Patent No.: US 7,465,504 B2
(45) Date of Patent: Dec. 16, 2008

(54) DIRECT OXIDATION FUEL CELL AND SYSTEM OPERATING ON CONCENTRATED FUEL USING LOW OXIDANT STOICHIOMETRY

(75) Inventors: Chao-Yang Wang, State College, PA (US); Guoqiang Lu, State College, PA (US); Fuqiang Liu, State College, PA (US); Takashi Akiyama, Suita (JP)

(73) Assignees: Panasonic Corporation, Osaka (JP); The Penn State Research Foundation, University Park, PA (US)

( * ) Notice: Subject to any disclaimer, the term of this patent is extended or adjusted under 35 U.S.C. 154(b) by 571 days.

(21) Appl. No.: 11/020,306

(22) Filed: Dec. 27, 2004

(65) Prior Publication Data

US 2006/0141338 A1  Jun. 29, 2006

(51) Int. Cl.
  *H01M 8/04* (2006.01)
  *H01M 8/00* (2006.01)
  *H01M 8/10* (2006.01)
  *H01M 4/00* (2006.01)
(52) U.S. Cl. .............................. 429/17; 429/13; 429/33; 429/42; 429/44
(58) Field of Classification Search ............ 429/30–33, 429/42, 136; 95/46, 241; 96/6, 155
  See application file for complete search history.

(56) References Cited

U.S. PATENT DOCUMENTS

| | | | |
|---|---|---|---|
| 5,599,638 A | 2/1997 | Surampudi et al. | |
| 6,296,964 B1 | 10/2001 | Ren et al. | |
| 6,821,658 B2 | 11/2004 | Acker et al. | |
| 6,942,718 B1 * | 9/2005 | Schmidt | 95/46 |
| 2004/0053084 A1 * | 3/2004 | Zhang et al. | 429/15 |
| 2004/0209136 A1 | 10/2004 | Ren et al. | |
| 2004/0209153 A1 * | 10/2004 | Peled et al. | 429/42 |
| 2004/0209154 A1 | 10/2004 | Ren et al. | |

FOREIGN PATENT DOCUMENTS

| | | | |
|---|---|---|---|
| EP | 1329972 A2 * | 7/2003 |
| JP | 2002-110191 | 4/2002 |
| JP | 2002-289200 | 10/2002 |
| JP | 2004-247091 | 9/2004 |

(Continued)

OTHER PUBLICATIONS

Lim, C. et al., "Development of high-power electrodes for a liquid-feed direct methanol fuel cell" *Journal of Power Sources*, 2002 Elsevier Science C.V.

(Continued)

*Primary Examiner*—Alexa D Neckel
*Assistant Examiner*—Claire L Rademaker
(74) *Attorney, Agent, or Firm*—McDermott Will & Emery LLP (57) ABSTRACT

A direct oxidation fuel cell system includes a membrane electrode assembly (MEA), a high concentration fuel and an oxidant source. Embodiments include a controller for adjusting the oxidant stoichiometric ratio or air flow to maximize the liquid water phase in the cathode exhaust and minimize the water vapor in the exhaust thereby eliminating the need for a water condenser for condensing water vapor produced and exhausted from the cathode of the MEA.

8 Claims, 6 Drawing Sheets

FOREIGN PATENT DOCUMENTS

| WO | WO 01/48853 A1 | 7/2001 |
| WO | WO 2004/032258 A2 | 4/2004 |
| WO | WO 2004/093231 A2 | 10/2004 |

OTHER PUBLICATIONS

Pasaogullari, U. et al. "Liquid Water Transport in Gas Diffusion Layer of Polymer Electrolyte Fuel Cells" *Journal of the Electrochemical Society*, 2004, The Electrochemical Society, Inc.

Pasaogullari, Ugar., et al. "Two-phase transport and the role of microporous layer in polymer electrolyte fuel cells." Electrochimica Acta, Elsevier Science Publishers, Barking GB, Oct. 1, 2004, pp. 4359-4369, XP004521157 ISSN: 0013-4686.

Natarajan, Dilip., et al. "A Two-Dimensional, Two-Phase, Multicomponent, Transient Model for the Cathode of a Proton Exchange Membrane Fuel Cell Using Conventional Gas Distributors." J. Electrochem. Soc. vol. 148, 2001, pp. A1324-A1335, XP002360269.

* cited by examiner

DIRECT OXIDATION FUEL CELL AND SYSTEM OPERATING ON CONCENTRATED FUEL USING LOW OXIDANT STOICHIOMETRY

FIELD OF THE INVENTION

The present invention relates generally to fuel cells, and more particularly, to air-circulating direct oxidation fuel cells that operate on high concentration of fuel.

BACKGROUND INFORMATION

A direct oxidation fuel cell (DOFC) is an electrochemical device that generates electricity from electro-oxidation of a liquid fuel. Liquid fuels of interest include methanol, formic acid, dimethyl ether (DME), etc. and their aqueous solutions. The oxidant may be substantially pure oxygen or a dilute stream of oxygen such as that in air. Significant advantages of employing a DOFC in portable and mobile applications (e.g. notebook computers, mobile phones, PDAs, etc.) include easy storage/handling and high energy density of the liquid fuel.

One example of a DOFC system is a direct methanol fuel cell or DMFC. A DMFC generally employs a membrane-electrode assembly (hereinafter "MEA") having an anode, a cathode, and a proton-conducting membrane electrolyte put therebetween. A typical example of the membrane electrolyte is one composed of a perfluorosulfonic acid-tetrafluoroethylene copolymer such as NAFION, NAFION is a registered trademark of E. I. Dupont de Nemours and Company). In a DMFC, a methanol/water solution is directly supplied to the anode as the fuel and air is supplied to the cathode as the oxidant. On the anode, methanol reacts with water in the presence of a catalyst, typically a Pt or Ru metal-based catalyst, to produce carbon dioxide, protons and electrons. The electrochemical reaction is shown as equation (1) below.

$$CH_3OH + H_2O \rightarrow CO_2 + 6H^+ + 6e^- \qquad (1)$$

During operation, the protons migrate to the cathode through the proton-conducting membrane electrolyte, which is non-conductive to electrons. The electrons travel to the cathode through an external circuit where electric power is delivered. On the cathode, the protons, electrons and oxygen molecules, typically from air, are combined to form water. The electrochemical reaction is given in equation (2).

$$3/2 O_2 + 6H^+ + 6e^- \rightarrow 3H_2O \qquad (2)$$

These two electrochemical reactions form an overall cell reaction as shown in equation (3).

$$CH_3OH + 3/2 O_2 \rightarrow CO_2 + 2H_2O \qquad (3)$$

One drawback of a conventional DMFC is that the methanol partly permeates the membrane electrolyte from the anode to the cathode, such permeated methanol is called "crossover methanol". The crossover methanol reacts with oxygen at the cathode, causing reduction in fuel utilization efficiency and cathode potential so that power generation of the fuel cell is suppressed. It is thus conventional for DMFC systems to use excessively dilute (3-6% by vol.) methanol solutions in the anode in order to limit methanol crossover and its detrimental consequences. However, the problem with such a DMFC system is that it requires a significant amount of water to be carried in a portable system, thus sacrificing the system energy density.

The ability to use high concentration fuel is highly desirable for portable power sources particularly since DMFC technology is competing with advanced batteries such as lithium-ion technology. However, even if the fuel cartridge carries little to no water, the anodic reaction, equation (1), still needs one water molecule per methanol molecule for complete electro-oxidation. Conversely, water is produced in the cathode from the reduction of oxygen, equation (2). Therefore, to take full advantage of a fuel cell employing high concentration fuel it would be desirable: (1) to maintain a net water balance in the cell where the total water loss from the cell (mainly through the cathode) should preferably not exceed the net production of water (i.e. two water molecules per every methanol molecule consumed according to equation (3)), and (2) to transport some of the produced water from the cathode to anode.

Two approaches have been developed to meet the above-mentioned goals in order to directly use concentrated fuel. One is an active water condensing and pumping system to recover cathode water vapor and return it to the anode (U.S. Pat. No. 5,599,638). While this method achieves the goal of carrying concentrated and even neat methanol in the fuel cartridge, it suffers from a significant increase in system volume and parasitic power loss due to the need for a bulky condenser and its cooling/pumping accessories.

The second approach is a passive water return technique in which the hydraulic pressure in the cathode is built up by applying a highly hydrophobic microporous layer (MPL) in the cathode and this pressure drives water from the cathode to the anode through a thin membrane (Ren et al. and Pasaogullari & Wang 2004). While this passive approach is efficient and does not incur parasitic power, the amount of water returned and hence the concentration of methanol fuel depends strongly on the cell temperature and power density. Presently, direct use of neat methanol is demonstrated only at or below 40° C. and at low power (less than 30 mW/cm$^2$). Considerably less concentrated methanol fuel is in high-power (e.g. 60 mW/cm$^2$) systems at elevated temperatures such as at 60° C. In addition, the need for thin membranes in this method sacrifices fuel efficiency and operating cell voltage, thus resulting in lower total energy efficiency.

There is thus a prevailing need to provide a direct oxidation fuel cell system that automatically maintains a balance of water in the fuel cell and returns a sufficient amount of water from the cathode to the anode under high-power and elevated temperature operating conditions. There is an additional need to provide a direct oxidation fuel cell that operates directly on highly concentrated fuel, including neat methanol, and minimizes the need for an external water supply or the condensation of electrochemically produced water.

SUMMARY OF THE DISCLOSURE

An advantage of the present invention is direct oxidation fuel cell system that operates on concentrated fuel.

Additional advantages, and other features of the present invention will be set forth in the description which follows and in part will become apparent to those having ordinary skill in the art upon examination of the following or may be learned from the practice of the present disclosure. The advantages may be realized and obtained as particularly pointed out in the appended claims.

According to the present invention, the foregoing and other advantages are achieved in part by a direct oxidation fuel cell system comprising at least one membrane electrode assembly (MEA) which includes an anode, cathode and proton-conductive electrolyte membrane therebetween. Typically, the fuel cell system includes a stack of such MEAs, which are sandwiched between an anode current collector plate and a cathode collector plate. The system further includes a fuel cartridge or container for housing a high concentration fuel which is in fluid communication with the anode of the MEA or cell stack and an oxidant source, e.g. air, in fluid communication with the cathode of the MEA or cell stack.

In accordance with an embodiment of the present invention, the fuel cell system comprises a controller for controlling or adjusting the oxidant stoichiometric ratio to the cathode. Preferably, the controller adjusts the oxidant stoichiometric ratio so as to maximize the liquid water phase and minimize the water vapor in the cathode exhaust thereby eliminating the need for a water condenser for condensing water vapor produced and exhausted from the cathode of the MEA.

Another advantage of the present invention is a membrane electrode assembly for use in a direct oxidation fuel cell. The assembly comprises a proton-conducting membrane electrolyte, having an anode electrode on one face and a cathode electrode on another face. Advantageously the cathode electrode includes a catalyst layer, a hydrophobic microporous layer and a hydrophobic gas diffusion layer, such that liquid water formed on the cathode can be removed, without causing substantial cathode flooding under a low air stoichiometric ratio, e.g., a stoichiometric ratio equal to or less than about 8, such as a ratio equal to or less than about 7, 6, 5, 4, 3, 2 etc.

Another advantage of the present invention is a method of operating a direct oxidation fuel system comprising at least one MEA and preferably a stack of MEAs. The method comprises providing a concentrated fuel to the anode of the MEA; providing an oxidant to the cathode of the MEA; and retaining liquid water from the cathode in sufficient quantity to supply all of the water needed for the electrochemical reaction in the anode for several hours and/or the entire duration of operating the direct oxidation fuel system.

Additional advantages of the present invention will become readily apparent to those skilled in this art from the following detailed description, wherein only the preferred embodiments of the present invention are shown and described, simply by way of illustration but not limitation. As will be realized, the invention is capable of other and different embodiments, and its several details are capable of modification in various obvious respects, all without departing from the spirit of the present invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DETAILED DESCRIPTION OF THE DISCLOSURE

The present invention stems from the recognition that cathode exhaust water, e.g. electrochemically produced water at the cathode, is partitioned into a liquid and a gas phase and the relative amounts of water in each phase is controlled mainly by temperature and air flow rate. It was discovered that the amount of liquid water can be maximized while the amount of water vapor minimized by using a sufficiently small oxidant flow rate or oxidant stoichiometry.

Liquid water from the cathode exhaust can thus be automatically trapped inside the cell, i.e. without the need for an external condenser, and combined in sufficient quantity with a high concentrated fuel, e.g. greater than about 5 molar (M), for the anode electrochemical reaction thereby maximizing the concentration of fuel and storage capacity and minimizing the overall size of the system. The water can be recovered either in an existing anode liquid/gas separator (such as those used to separate $CO_2$ gas and aqueous methanol solution), or by using an additional hydrophobic filter on the cathode electrode.

In one aspect of the present invention, a direct oxidation fuel cell comprises an MEA which includes a polymer electrolyte membrane and a pair of electrodes (an anode and a cathode) composed of a catalyst layer and a gas diffusion layer sandwiching the membrane. Typical polymer electrolyte material include fluorinated polymers having perfluoro sulfonate groups or hydrocarbon polymers such as poly-(arlynene ether ether ketone) (PEEK). The electrolyte membrane can be of any thickness as, for example, between about 25 and about 180 micrometers. The catalyst layer typically comprise platinum or ruthenium based metals, or alloys thereof. The anode and cathode are typically sandwiched by separator plates having channels to supply fuel to anode and an oxidant to the cathode. A fuel cell can contain a plurality of such MEAs with at least one electrically conductive separator placed between adjacent MEAs to electrically connect the MEAs in series with each other, and to provide mechanical support.

In accordance with embodiments of the present invention, the fuel cell system comprises a controller for controlling or adjusting the oxidant stoichiometric ratio. Preferably, the controller adjusts the oxidant flow rate or stoichiometric ratio so as to maximize the liquid water phase in the cathode exhaust and minimize the water vapor in the exhaust thereby eliminating the need for a water condenser. In an embodiment of the present invention, the oxidant stoichiometric ratio is about 8 or less, e.g., about 7, 5, 4, 3, or 2 or less.

In practicing an embodiment of the present invention, the controller adjusts the oxidant stoichiometric ratio according to equation (I):

$$\zeta_c = \frac{0.42(\gamma + 2)}{3\eta_{fuel}} \frac{p}{p_{sat}} \qquad (I)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency. Such controlled oxidant stoichiometry automatically ensures an appropriate water balance in the DMFC (i.e. enough water for the anode reaction) under any operating conditions. For instance, during start-up of a DMFC system when the cell temperature increases from e.g. 20° C. to the operating point of 60° C., the corresponding $p_{sat}$ is initially low, and hence a large oxidant stoichiometry should be used in order to avoid excessive water accumulation in the system and therefore cell flooding by liquid water. As the cell temperature increases, the oxidant stoichiometry decreases according to Eq.(I).

Figure 1:
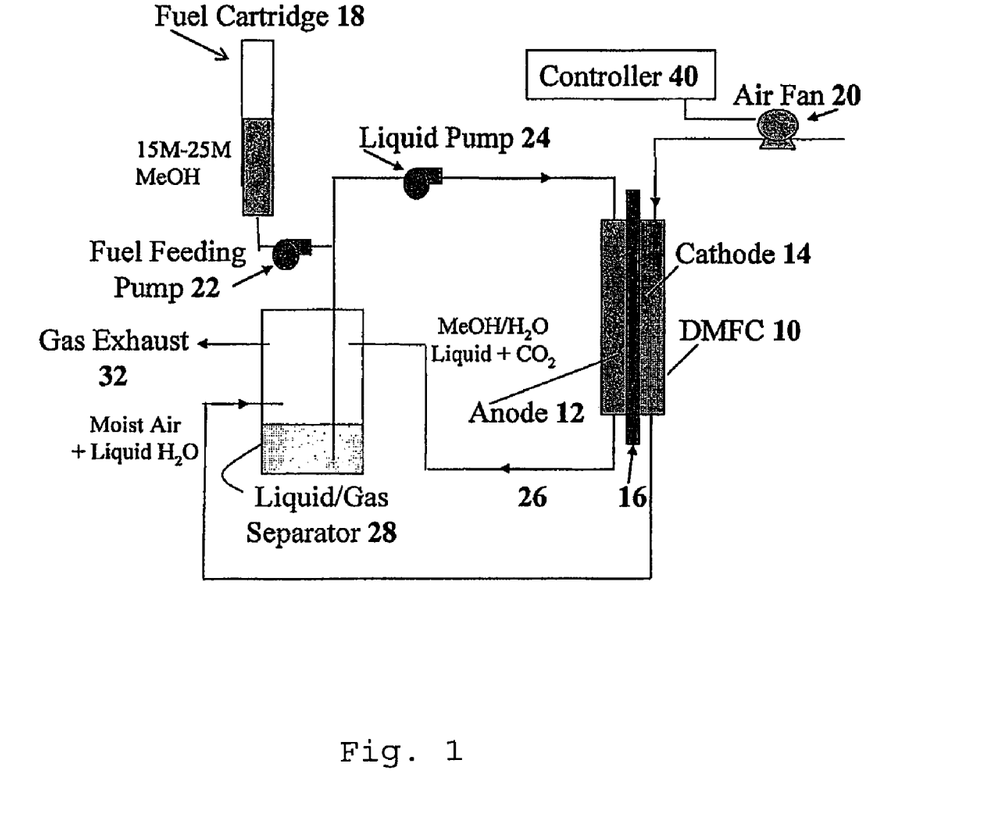
FIG. 1 is a schematic illustration of a direct methanol fuel cell system operating directly on high concentration fuel in accordance with an embodiment of the present invention.

The invention will be explained in further detail with reference to the following figures which show and facilitate the understanding of certain embodiments of the present invention and are not to be interpreted as limiting the inventive concept disclosed herein. For example, FIG. 1 schematically illustrates a direct oxidation fuel cell system. In accordance with an embodiment of the present invention, FIG. 1 shows methanol as the fuel used in the system. However, other fuels are also contemplated by the present invention, including formic acid, dimethyl ether, etc.

As shown in FIG. 1, the fuel cell system includes anode 12, cathode 14, and a proton-conducting electrolyte membrane 16. Anode 12, cathode 14 and membrane 16 are preferably a multi-layered composite structure referred to as an MEA. Typically a fuel cell system will have a plurality of such MEAs in the form of a stack and such a cell stack is contemplated by the present invention. FIG. 1 only shows a single MEA for simplicity. Typically, the membrane electrode assemblies are separated by bipolar plates that have serpentine channels for supplying and returning fuel and by-products to and from the assemblies (not shown for illustrative convenience). In a fuel cell stack, MEAs and bipolar plates are aligned in alternating layers to form a stack of cells and the ends of the stack are sandwiched with current collector plates and electrical insulating plated and the entire unit is secured with fastening structures.

A source of fuel, e.g. fuel container or cartridge 18, is in fluid communication with anode 12 and an oxidant, e.g. air controlled by fan 20, is in fluid communication with cathode 14. In accordance with aspects of the present invention, fuel supplied to the anode is in highly concentrated form, e.g., greater than about 5M and preferably greater than about 10M, 15M, 20M, etc. up to and including a substantially pure, i.e. neat, form of the fuel. In this particular example, methanol is contained in fuel cartridge 18 in a concentration between about 15M to approximately neat methanol (about 25M). High concentrated fuel from fuel cartridge 18 can be fed directly into the liquid/gas separator 28 by pump 22, or directly into the anode by pump 22 and 24. In operation, the fuel is introduced to the anode side of the MEA or in the case of a cell stack to an inlet manifold of an anode separator of a cell stack. Excess fuel, water and $CO_2$ gas is withdrawn from the anode side of the MEA or anode cell stack through port 26 and into liquid/gas separator 28. The air or oxygen is introduced to cathode 14 and regulated to maximize electrochemically produced water in liquid form while minimizing water vapor and thus minimizing the escape of water vapor from the system.

In accordance with an embodiment of the present invention, air is introduced to the cathode and excess air and liquid water is withdrawn from the cathode at port 30 and included in the liquid/gas separator 28. As discussed further below, the air flow rate or air stoichiometry is controlled to maximize the liquid phase of the electrically produced water while minimizing the vapor phase of the electrochemically produced water. The control of the oxidant stoichiometry ratio can be by setting fan 20 to a fixed rate depending on the fuel cell system operating conditions or by controller 40. Controller 40 adjusts the oxidant stoichiometric ratio so as to maximize the liquid water phase in the cathode exhaust and minimize the water vapor in the exhaust thereby minimizing the need for a water condenser to condense water vapor produced and exhausted from the cathode of the MEA. In addition, Controller 40 can increase the oxidant stoichiometry beyond the minimum setting during cold-start in order to avoid excessive water accumulation in the cell.

Thus, liquid water can accumulate in the liquid/gas separator 28 which is then returned to the anode 12 via circulating pump 24. Exhaust carbon dioxide gas is released through port 32 of liquid/gas separator 28.

High concentration fuel from the fuel cartridge can be fed at the point indicated in FIG. 1, or directly into the liquid/gas separator, or into the anode inlet manifold of the fuel cell stack, or perpendicularly to the face of anode plate like a shower through a porous structure. Multiple-port feeding of high concentration fuel is also possible and may provide advantages in certain applications. High concentration fuel can be fed by a second liquid pump different from the one that circulates the methanol/water solution inside the system, as indicated in FIG. 1. Alternatively, flows of both high concentration fuel and $MeOH/H_2O$ from the liquid/gas separator can be driven by a single pump with appropriate check valves on each path.

At the start of operating the fuel cell, a small initial charge (less than about 30 ml) of dilute methanol solution ranging from zero to 6M can be contained inside the liquid/gas separator. Alternatively, there can be no initial charge in the liquid/gas separator. When using high concentrated fuel directly, the DMFC will initially experience a slightly large methanol crossover and the crossover methanol in turn produces sufficient water in the cathode to allow the amount of water in the liquid/gas separator to increase until a steady-state is reached. From this point onward, the DMFC system will operate according to the design specifications.

In an embodiment of the present invention, the liquid/gas separator can be housed inside the fuel cartridge compartment using an inflatable plastic bag. The fuel cartridge compartment can be initially full of high concentration methanol fuel while the liquid/gas separator is deflated. Upon operation of the DMFC system, fuel is gradually consumed, thus leaving room for the liquid/gas separator to grow in size. This design virtually eliminates space requirement of the liquid/gas separator in the system.

In this example, a single liquid/gas separator is used to retain liquid water from the cathode exhaust as well as to separate $CO_2$ gas from the anode liquid effluent. This approach simultaneously fulfills two goals for employing high concentration fuel. Namely, maintaining water balance within the cell by limiting the water vapor escape rate and automatically returning liquid water to the anode without an external condensation or pumping of water.

Through investigation, the relationships among some of the operating conditions for the fuel cell system was determined. As provided below, the amount of cathode water needed to be retained in the cell can be determined by controlling the oxidant stiochiometry by the following relationships, given for a high concentration of methanol fuel, but applicable to any fuel for a direct oxidation fuel cell. For example, if $\xi_c$ is the oxidant, e.g., air stoichiometry, the water vapor loss from a fuel cell through the cathode exhaust gas is given by equation (4).

$$J_{loss} = \frac{p_{sat}}{p} \frac{\xi_c}{0.21} \frac{I}{4F} \qquad (4)$$

where $P_{sat}$ (as defined in Equation 9) is the water vapor saturation pressure corresponding to the cell temperature, T, p the atmospheric pressure (i.e. the cathode operating pressure), I the operating current density of the cell, and F is Faraday's constant.

The net water production rate from the cell can be expressed by equation (5).

$$J_{prod} = \frac{1}{\eta_{fuel}} \frac{I}{3F} \qquad (5)$$

where $\eta_{fuel}$ denotes the fuel efficiency customarily defined as the ratio of the operating current density, I, to the sum of the operating current density and methanol crossover current density, $(I+I_{xover})$. Therefore, the net water loss from the DMFC system is equal to $J_{H2O}$, as given by equation (6).

The first term on the right hand side of Equation (6) also implies that the theoretical air flow rate required to generate a current density of I is equal to (I/4F)/0.21 as four electrons are needed to reduce one mole of oxygen and air contains 21% of oxygen. However, the actual air flow rate is expressed as $\xi_c$(I/4F)/0.21 in the first term on the right hand side of Equation (6). Thus, it is understood that the oxidant stoichiometry is defined as the ratio of an actual oxidant flow rate to the amount electrochemically required to produce the current density of I.

$$J_{H2O} = \left( \frac{p_{sat}}{p} \frac{\xi_c}{0.84} - \frac{1}{3\eta_{fuel}} \right) \frac{I}{F} \qquad (6)$$

On the other hand, the net consumption rate of methanol in the system is given by equation (7).

$$J_{MeOH} = \frac{1}{\eta_{fuel}} \frac{I}{6F} \qquad (7)$$

Thus, the molar ratio of water to methanol in the fuel supply is given by equation (8).

$$\gamma = \frac{J_{H2O}}{J_{MeOH}} = \frac{p_{sat}}{p} \frac{3\xi_c \eta_{fuel}}{0.42} - 2 \qquad (8)$$

Figure 2:
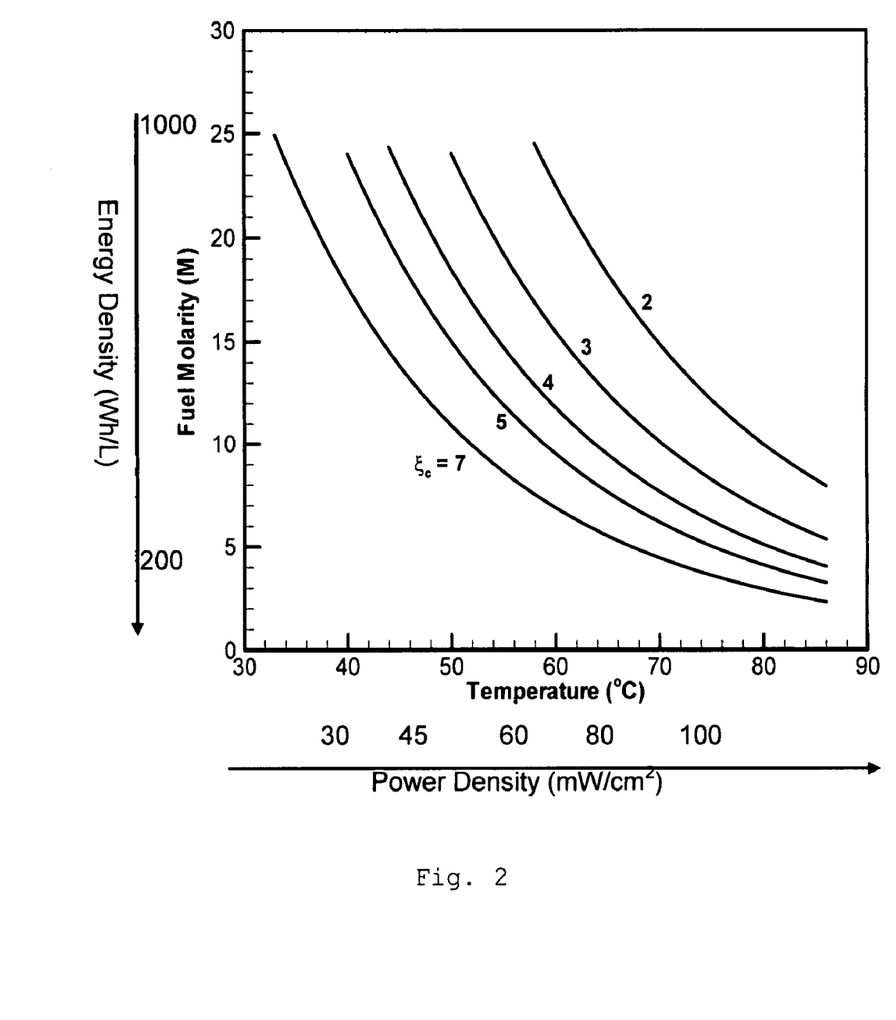
FIG. 2 is a graph showing the relationship of methanol concentration in the fuel cartridge as a function of the operating temperature and air stoichiometry in accordance with an embodiment of the present invention.

This water-to-methanol molar ratio has a one-to-one correspondence to the methanol feed concentration in M, or mole of methanol per liter of the solution. Consider a typical fuel efficiency of 80% and recognize that p is about 1 bar and $p_{sat}$ is solely a function of the cell temperature, an approximation of which can be expressed as $$\log p_{sat} = -2.1794 + 0.02953T - 9.1837 \times 10^{-5} T^2 + 1.4454 \times 10^{-7} T^3 \qquad (9)$$

where T is the cell temperature in degree Celsius. The highest possible methanol concentration in the fuel cartridge as required by equation (8) is thus dependent on the temperature and air stoichiometry only. A graphic representation of such relationships is shown in FIG. 2. For neat methanol operation (about 25M), the air stoichiometry should decrease with temperature and can be determined by setting the left hand side of equation (8) to zero, namely $$\xi_c = \frac{0.28}{\eta_{fuel}} \frac{p}{p_{sat}} \qquad (10)$$

Figure 3:
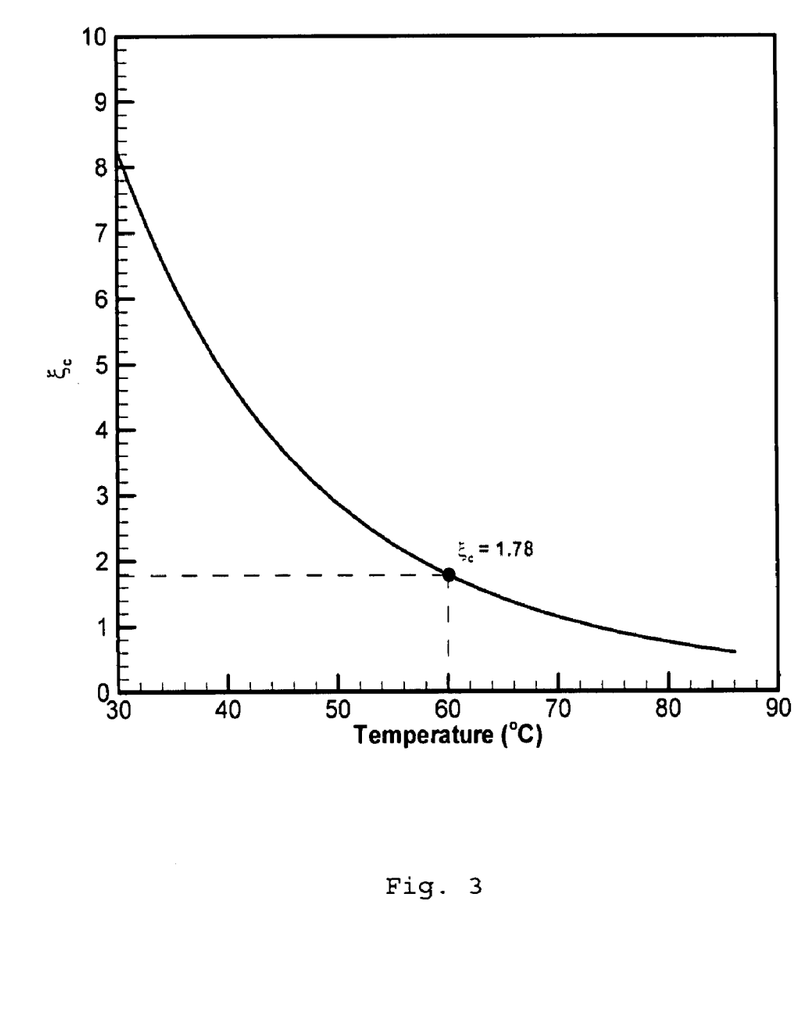
FIG. 3 is a graph showing the air stoichiometry required for neat methanol operation under various temperatures.
Figure 4:
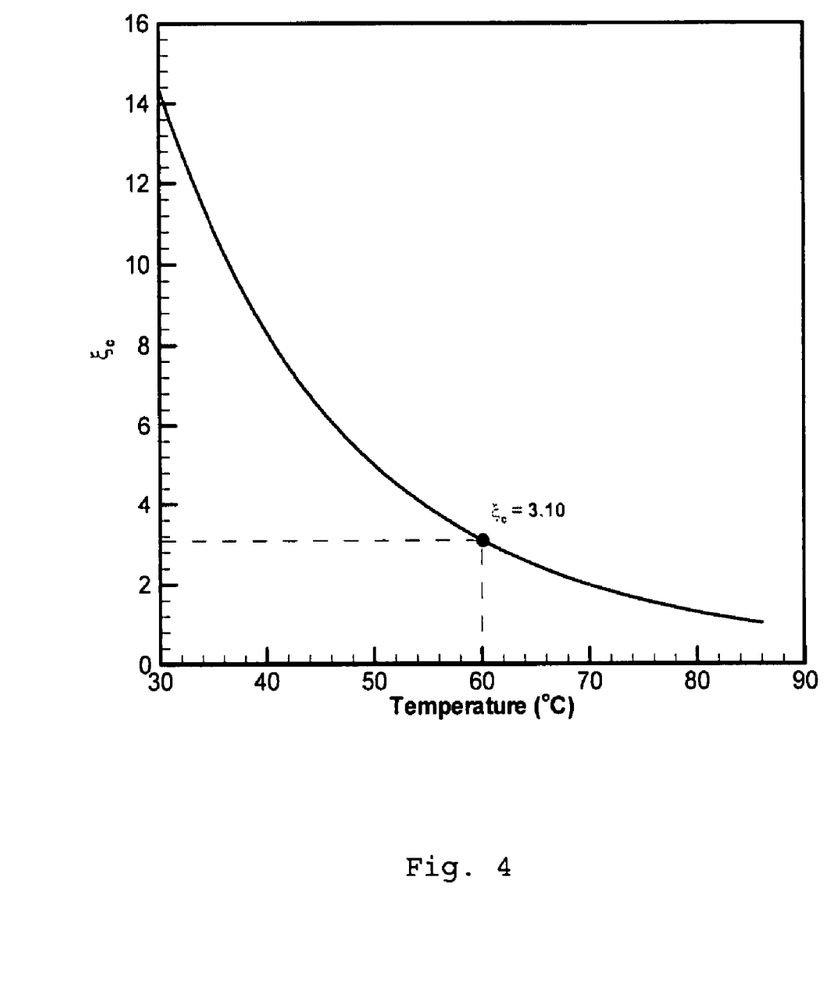
FIG. 4 is a graph showing the air stoichiometry requirement for 15M operation under various temperatures.

For $\eta_{fuel}$=80% and at 60° C., the required air stoichiometry given by equation (10) is 1.78. FIG. 3 shows the corresponding air stoichiometry at various operating temperatures for neat methanol operation, while FIG. 4 plots the same relationship for the direct feeding of a 15M methanol fuel. It is clear from FIG. 3 that air stoichiometry must be as low as 1.78 in order to be capable of directly feeding neat methanol at a cell temperature of 60° C.

To further facilitate the collection of liquid water, the cathode can be optimized. Advantageously the cathode electrode includes a catalyst layer, a hydrophobic microporous layer and a hydrophobic gas diffusion layer, such that liquid water formed on or at the cathode can be removed, without causing substantial cathode flooding under a low air stoichiometric ratio, e.g., a stoichiometric ratio equal to or less than about 8 or 5. Under low air stoichiometry conditions, the cathode catalyst layer should still allow efficient oxygen diffusion to achieve good cell performance.

As an example of forming the catalyst layer, a catalyst-coated membrane (CCM) was prepared by the decal method (i.e. catalyst NAFION solution ink applied first to a PTFE decal and subsequently transferred onto a membrane) using a carbon supported platinum catalyst, e.g. a 40% Pt/Vulcan XC72 (from E-TEK). The loading of Pt/C was about 1.2 mg/cm$^2$. The ratio of catalyst to NAFION was maintained at approximately 2:1 (dry weight) in order to minimize the ionic resistance through the catalyst layer as well as to create sufficient void fraction for efficient oxygen diffusion. The resulting cathode catalyst layer has a thickness between 15 and 20 μm. Such a thin and porous catalyst layer has excellent gas diffusion and water removal capability. Other methods to fabricate thin and porous catalyst layers exist as known to those skilled in the art.

The microporous layer (MPL) can be made optimized by coating a solution containing Vulcan XC72R carbon black and 40wt % polytetrafluorethylene (PTFE) onto the gas diffusion layer. Another aspect in the optimized MPL design is that its thickness is substantially greater than normally employed in diffusion media for fuel cells. For example, MPLs of 25-50 μm in thickness were more effective in wicking liquid water out of the cathode than a 20 μm thick MPL that is typically contained in MPLs designed for high air stoichiometry. Together, a thick MPL along with its small average pore size between about 10 and about 500 nm (0.01 μm and about 0.5 μm) and high hydrophobicity greatly facilitates wicking of liquid water out of the cathode catalyst layer as well as improve electric contact between the GDL and catalyst layer.

For cathode gas diffusion layer (GDL), a carbon cloth pre-treated with 20wt % PTFE can be used. The resulting GDL exhibits high hydrophobicity and strong anisotropy, thus greatly facilitating liquid water removal from the cathode without severely flooding the cathode and hence impairing the cathode performance. The mass-transport limiting current density of the said GDL was found to be 65% higher than the commonly used Toray carbon paper GDL. However, properly designed and pre-treated carbon paper GDLs should also be suitable for low air stoichiometry operation as known to those skilled in the art.

As shown in FIG. 2, the fuel molarity (M) corresponds to the energy density of the cell, while the temperature is a good measure of the power density. Thus, the two axes of FIG. 2 correspond to the energy and power densities, similar to the Ragone plot for a battery. At the operating temperature of 60° C., the cell's power density realistically ranges from about 60 to 80 mW/cm$^2$. For neat methanol, the electric energy density amounts to roughly 1,000 Wh per liter of fuel assuming an energy-conversion efficiency of approximately 20%.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

An experiment was conducted in which a cell having a 5 cm$^2$ active area was used, the cathode GDL was comprised of a carbon cloth GDL of 300 µm in thickness and a 30 µm thick microporous layer (MPL). The anode backing layer was a Toray carbon paper TGPH 090 with the thickness of 260 µm. The MEA was made by hot-pressing the anode backing layer and cathode GDL onto a catalyst coated Nafion® 112 membrane. The loading of Pt—Ru (Pt—Ru black HiSPEC 6000, Pt:Ru=1:1 atomic ratio, Alfa Aesar, a Johnson Matthey Company) on the anode and Pt (supported on carbon 40% Pt/Vulcan XC72 from E-TEK) was 6 mg/cm$^2$ and 1.2 mg/cm$^2$, respectively. The MEA was installed in a conventional cell fixture with serpentine flowfield, and the cell was operated in the same setup as shown in FIG. 1.

Figure 5:
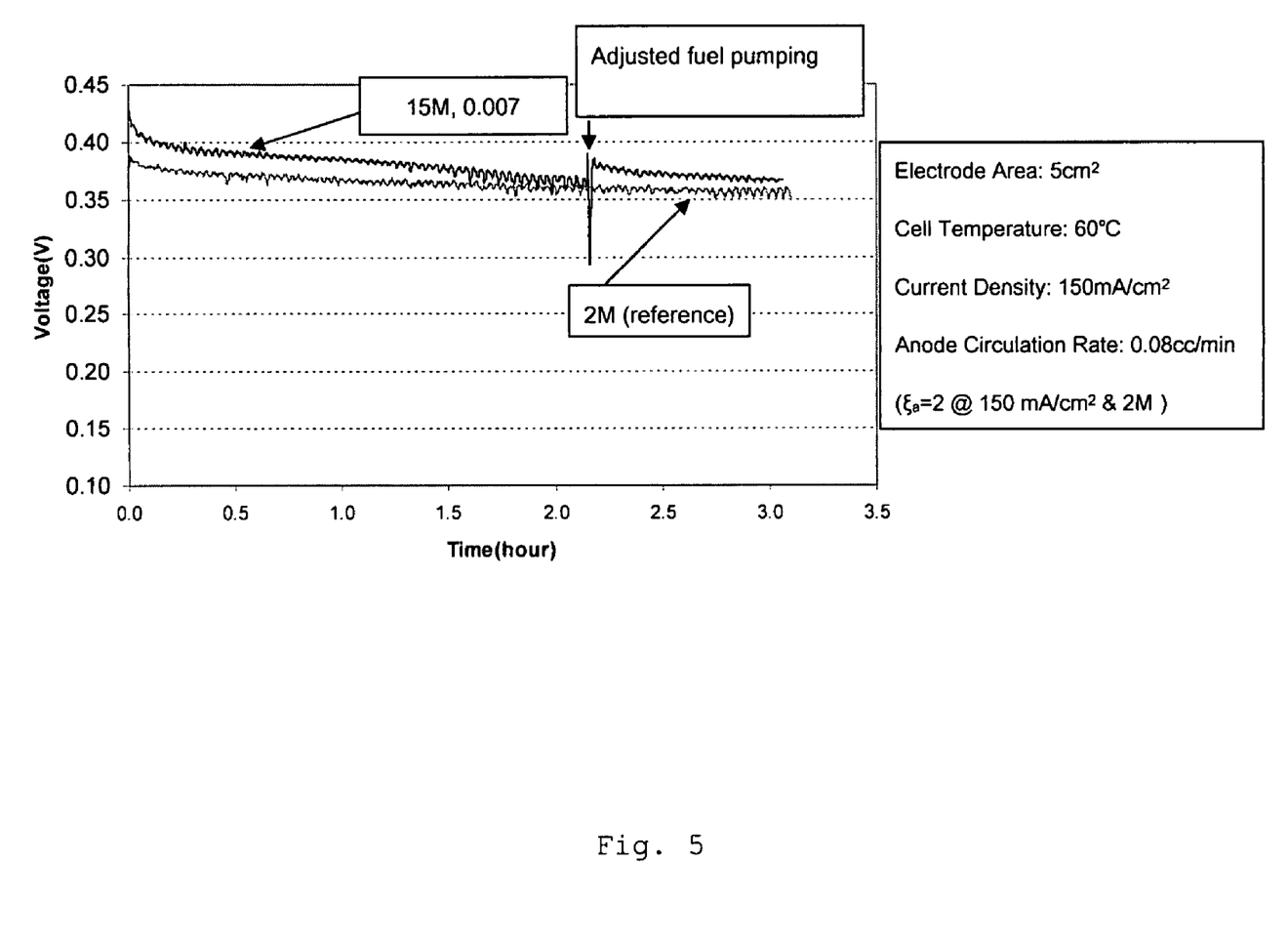
FIG. 5 is a voltage curve of a 5 cm$^2$ cell in accordance with an embodiment of the present invention discharged at 150 mA/cm$^2$ during a 3-hr test with a 15M fuel feed, and a comparison curve from a reference cell operated at a constant 2M fuel feed at the anode.

FIG. 5 shows the voltage curve of the 5 cm$^2$ cell discharged at 150 mA/cm$^2$ while feeding with 15M methanol fuel. The fuel feeding rate was 7 µl/min, and the cathode air stroichiometry was set at about 4 for 150 mA/cm$^2$. In comparison with a reference cell performance operated constantly at 2M and under otherwise identical conditions, the cell in accordance with an embodiment of the present invention produced similar or slightly better performance. In addition, the high concentration fuel cell can operate stably during the 3-hour test.

Figure 6:
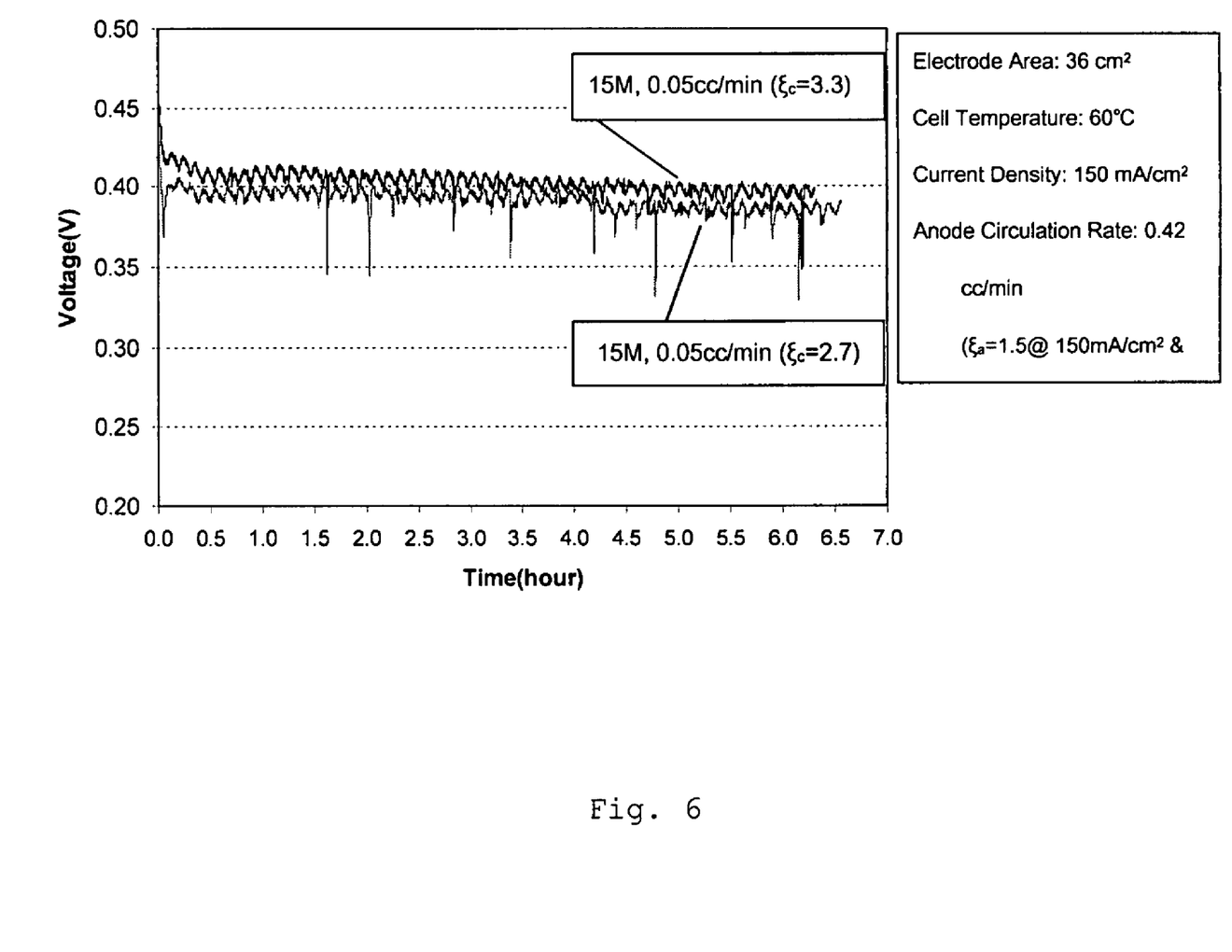
FIG. 6 are voltage curves of a 36 cm$^2$ cell in accordance with an embodiment of the present invention discharged at 150 mA/cm$^2$ during a 6.5-hr test with a 15M fuel feed and under two air stoichiometric ratios.

By way of comparison, another experiment was conducted in which an experimental cell having a 36 cm$^2$ active area was operated under the experimental conditions indicated in FIG. 6. Two tests were carried out with air stoichiometry of 2.7 and 3.3, respectively. The fuel feeding rate was 50 µl/min in both tests. It can be seen that both cases were successfully operated for 6.5 hours, with the air stoichiometry of 3.3 outperforming that of 2.7. The power density achieved was 60 mW/cm$^2$ (0.4V @ 150 mA/cm$^2$) at 60° C. and feed of 15M methanol.

These examples thus demonstrate that the present invention enables direct use of highly concentrated fuel, with no external supply or condensation of water, and matching optimized cell performance with diluted methanol. It should be noted that the fuel feeding rate and air stoichiometry used vary with cell operating conditions and fuel concentration in the fuel tank.

Additional experiments were also performed to assess the sensitivity of cell performance in accordance with the invention to the methanol concentration of the initial charge in the liquid/gas separator. Between 1 and 3M, the cell performance was found to approach the same steady-state after approximately 90 minutes, regardless of the initial methanol concentration. The robustness of the cell in accordance with the invention was also confirmed experimentally under constant-voltage discharge.

Only the preferred embodiments of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A direct oxidation fuel cell system, the system comprising:
   at least one membrane electrode assembly (MEA) comprising an anode, cathode and a proton-conductive electrolyte membrane, which is sandwiched between an anode current collector plate and a cathode collector plate;
   a fuel cartridge containing high concentration fuel of at least 10 M, in fluid communication with the anode of the at least one MEA;
   an oxidant source in fluid communication with the cathode of the at least one MEA; and
   a controller for controlling an oxidant stoichiometric ratio to about 5 or less,
   in order to maximize liquid water contained in the cathode exhaust, wherein:
   the controller controls the oxidant stoichiometric ratio according to equation (i):

$$\zeta_c = \frac{0.42(\gamma + 2)}{3\eta_{fuel}} \frac{p}{p_{sat}} \quad (i)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

2. The direct oxidation fuel cell system of claim 1, further comprising a liquid/gas separator in fluid connection with the MEA to retain liquid water and unreacted fuel.

3. The direct oxidation fuel cell system of claim 2, wherein the liquid/gas separator contains an initial charge of a dilute fuel/water solution.

4. The direct oxidation fuel cell system of claim 2, wherein the liquid/gas separator comprises an inflatable plastic bag which is housed in the fuel cartridge.

5. The direct oxidation fuel cell system of claim 1, wherein the system excludes a water condenser for condensing water vapor produced and exhausted from the cathode of the MEA.

6. The direct oxidation fuel cell of claim 1, wherein the fuel cartridge contains at least 15M methanol.

7. A method of operating a direct oxidation fuel system comprising at least one membrane electrode assembly (MEA), which includes an anode, cathode and a proton-conductive electrolyte membrane therebetween, the method comprising:
- providing a concentrated fuel of at least 10 M, to the anode of the MEA;
- providing an oxidant to the cathode of the MEA; and
- recovering liquid water directly from the cathode in sufficient quantity to supply all of the water needed for the electrochemical reaction in the anode for the entire duration of operating the direct oxidation fuel system;

comprising adjusting the oxidant to a stoichiometric ratio according to equation (i):

$$\zeta_c = \frac{0.42(\gamma + 2)}{3\eta_{fuel}} \frac{p}{p_{sat}} \qquad (i)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency.

8. The method of claim 7, wherein said liquid water is formed on the cathode and is removed, without causing substantial cathode flooding.

* * * * *